US011757635B2

(12) United States Patent
Muhanna et al.

(10) Patent No.: US 11,757,635 B2
(45) Date of Patent: Sep. 12, 2023

(54) CLIENT AUTHENTICATION AND ACCESS TOKEN OWNERSHIP VALIDATION

(71) Applicant: MAVENIR NETWORKS, INC., Richardson, TX (US)

(72) Inventors: Ahmad Muhanna, Richardson, TX (US); Peter J. McCann, Bridgewater, NJ (US)

(73) Assignee: Mavenir Networks, Inc., Richardson, TX (US)

( * ) Notice: Subject to any disclaimer, the term of this patent is extended or adjusted under 35 U.S.C. 154(b) by 130 days.

(21) Appl. No.: 17/177,793

(22) Filed: Feb. 17, 2021

(65) Prior Publication Data
US 2021/0288802 A1    Sep. 16, 2021

Related U.S. Application Data

(60) Provisional application No. 62/989,170, filed on Mar. 13, 2020.

(51) Int. Cl.
*H04L 29/06* (2006.01)
*H04L 9/32* (2006.01)
*H04L 9/08* (2006.01)

(52) U.S. Cl.
CPC ........... *H04L 9/3213* (2013.01); *H04L 9/083* (2013.01); *H04L 9/085* (2013.01); *H04L 9/3236* (2013.01); *H04L 9/3247* (2013.01); *H04L 9/3263* (2013.01)

(58) Field of Classification Search
CPC ....... H04L 9/3213; H04L 9/083; H04L 9/085; H04L 9/3236; H04L 9/3247;
(Continued)

(56) References Cited

U.S. PATENT DOCUMENTS 8,775,810 B1 * 7/2014 Snodgrass ................. H04L 9/08
  713/175
8,997,198 B1 * 3/2015 Kelley ................... G06F 21/335
  726/4

(Continued)

FOREIGN PATENT DOCUMENTS

CN    109067774 B   *   2/2021   ......... H04L 63/0435
CN    112787986 A   *   5/2021
(Continued)

OTHER PUBLICATIONS

3 Generation Partnership Project; Technical Specification Group Services and System Aspects"Security architecture and procedures for 5G system (Release 16)", 3GPP Standard; Technical Specification; 3GPP TS 33.501, FRANCE; vol. SA WG3, No. V16.1.031 Dec. 2019 (Dec. 31, 2019), pp. 1-202, XP051841018, Retrieved from the Internet:URL:ftp://ftp.3gpp.org/Specs/archive/33_se ries/33.501/33501-g10.zip 33501-g10.doc [retrieved on Dec. 31, 2019]*the whole document *.

(Continued)

*Primary Examiner* — Sher A Khan
(74) *Attorney, Agent, or Firm* — Ruggiero, McAllister & McMahon LLC

(57) ABSTRACT

A method of performing validation of an access token under OAuth 2.0 protocol includes: providing, by an authorization server, the access token for service to a client in response to a request for the access token; adding, by the client, a client signature to at least the access token; forwarding, by the client, the access token as part of a service request to a resource server; and validating, by the resource server, whether the client is a valid owner of the access token, wherein the validation is based on at least the client signature of the access token. The validation is based on a hash of a combination of the service request, the access token and a shared secret key common to the client and the resource (Continued)

server, the output of which hash is added to the service request, and the resource server validates the hash.

10 Claims, 10 Drawing Sheets

(58) Field of Classification Search
CPC .............. H04L 9/3263; H04L 63/0807; H04L 63/0823; H04L 63/0884; H04W 12/108; H04W 12/122; H04W 12/084
See application file for complete search history.

(56) References Cited

U.S. PATENT DOCUMENTS

| | | | | |
|---|---|---|---|---|
| 10,142,107 B2* | 11/2018 | Frei | ................. | H04L 9/0869 |
| 2003/0165241 A1* | 9/2003 | Fransdonk | ............ | G06Q 20/12 |
| | | | | 380/258 |
| 2003/0177400 A1* | 9/2003 | Raley | ................. | H04N 21/4788 |
| | | | | 713/168 |
| 2005/0076198 A1* | 4/2005 | Skomra | ............. | H04L 63/0823 |
| | | | | 713/156 |
| 2006/0015932 A1* | 1/2006 | Ballinger | ........... | H04L 63/0823 |
| | | | | 726/9 |
| 2006/0264202 A1 | 11/2006 | Hagmeier et al. | | |
| 2008/0109362 A1* | 5/2008 | Fransdonk | .......... | H04L 63/0823 |
| | | | | 705/51 |
| 2008/0126794 A1* | 5/2008 | Wang | .................... | H04L 9/3263 |
| | | | | 713/153 |
| 2015/0350186 A1* | 12/2015 | Chan | .................. | H04L 63/0815 |
| | | | | 726/9 |
| 2016/0262013 A1* | 9/2016 | Redberg | ................ | H04W 8/245 |
| 2017/0346807 A1* | 11/2017 | Blasi | .................... | H04L 9/3247 |
| 2018/0278603 A1* | 9/2018 | Yabe | .................. | H04L 63/0892 |
| 2019/0156008 A1* | 5/2019 | Tamura | .............. | H04L 63/0892 |
| 2020/0092101 A1* | 3/2020 | Ajitomi | ................ | H04L 9/3213 |

FOREIGN PATENT DOCUMENTS

| | | | | |
|---|---|---|---|---|
| JP | 2010113462 A | * | 5/2010 | |
| WO | WO-2013056674 A1 | * | 4/2013 | ......... H04L 63/0807 |
| WO | WO-2018161807 A1 | * | 9/2018 | ............. H04L 29/06 |
| WO | WO-2019079928 A1 | * | 5/2019 | ............. G06F 21/31 |
| WO | 2020030852 A1 | | 2/2020 | |
| WO | WO-2020123959 A1 | * | 6/2020 | ............. G06F 21/33 |

OTHER PUBLICATIONS

Extended European Search Report and Written Opinion for corresponding European application EP21160440.0, 13 pages, dated Jul. 6, 2021.

* cited by examiner

FIG. 1

| | | Expiration Date/Time 1001 | cNF Authenticated ID 1002 | NRF signature 1003 | (Http Service Request) HASH 2004 | cNF signature 1005 |
|---|---|---|---|---|---|---|

101 brackets columns 1002 and 1003

FIG. 2

CLIENT AUTHENTICATION AND ACCESS TOKEN OWNERSHIP VALIDATION

CROSS-REFERENCE TO RELATED APPLICATIONS

The present application claims the benefit of U.S. Provisional Patent Application No. 62/989,170, filed on Mar. 13, 2020, which is incorporated by reference herein in its entirety.

BACKGROUND OF THE DISCLOSURE

1. Field of the Disclosure

The present disclosure relates to a system and a method for authorizing a user or a client using an access token mechanism in a wireless network, and relates more particularly to a system and a method utilizing OAuth 2.0 in $5^{th}$-Generation Core (5GC)-based mobile networks.

2. Description of the Related Art

OAuth 2.0, which an authorization protocol currently being mandated for 5G Core (5GC), is utilized to provide a mechanism for authorizing a user/client (e.g., consumer network function (cNF) to receive or access another 3rd party resource server (e.g., producer Network Function (pNF)). In general, OAuth 2.0 protocol identifies three entities as follows: 1) Oauth 2.0 Authorization server, which is the Network Resource Function (NRF) in 3GPP 5G Core security architecture; 2) Oauth 2.0 Client, which is the consumer Network Function (cNF) in in 3GPP 5G Core security architecture; and 3) Oauth 2.0 Resource Server, which is the producer Network Function (pNF) in 3GPP 5G Core security architecture. After the cNF registers with NRF and discovers the pNF it would receive service from, the cNF sends an authorization request (e.g., Access_Token_Get Request) to the NRF. The NRF authenticates the cNF using mutual Transport Layer Security (mTLS) by validating the certificate of the cNF and the cNF ID that is included in the cNF certificate. After mutual authentication between the cNF and the NRF, the NRF issues an access token to the cNF that can be used to present to the pNF.

Amongst other information, the access token includes the following: the cNF ID that has been authenticated by the NRF; the expiration Date; Scope of the service the cNF is being authorized to receive; the pNF ID or the pNF type; and the NRF signature. One of the most important aspects of the access token is that the token includes the NRF signature. In other words, the NRF signs the access token using its private key. A pNF always TRUSTs the NRF and has a secure access to the NRF public key to be able to validate the access token.

Current validation scheme includes validating the NRF signature, validating the access token expiration date, the scope, etc. One of the aspects of the validation that is still not completely resolved is the validation of the ownership of the access token, i.e., how the pNF ensures that the presented access token was actually issued to the cNF that is presenting the token. In the case of direct communication between the cNF and the pNF, the validation of ownership can be done by validating the cNF ID which is included in the access token, and thereby ensure it is the same as the cNF ID in the cNF Transport Layer Security (TLS) certificate. In other words, after the pNF authenticates the cNF through mutual Transport Layer Security (mTLS) protocol using the cNF TLS certificate, the pNF compare the cNF ID in the certificate with the authorized ID in the access token. However, there is no currently-known solution for the validation of the access token ownership when the cNF communicates with the pNF through a proxy node, i.e., during hop-by-hop security. Therefore, there is a need for mechanisms to enable access token ownership validation during indirect communication or over secure hop-by-hop links.

SUMMARY OF THE DISCLOSURE

The present disclosure provides example embodiments of mechanisms to enable access token ownership validation during indirect communication or over secure hop-by-hop links with multiple proxy nodes in the middle between the cNF and the pNF.

The present disclosure provides example embodiments of solutions to the issue of the pNF not being able to validate the ownership of the access token during indirect communication or secure hop-by-hop.

In one example embodiment, secure hop-by-hop communication can be used to provide proof of ownership as long as there is a trust model between the pNF, the cNF and the proxy node between the pNF and the cNF, e.g., Service Communication Proxy (SCP). This static trust model can work in multiple ways. The following two ways are listed as examples: i) pNF and cNF are statically configured with the SCP(s) that is allowed to trust; or ii) pNF and cNF dynamically discover the trusted SCP(s) using, for example, operator secure infrastructure Domain Name System (DNS) or Network Repository Function (NRF).

In one example embodiment, when the cNF receives the access token from the NRF, the cNF does the following at the time of sending the service request to the pNF through SCP: i) adds the time stamp at the end of the access token; and ii) signs the whole token with the time stamp and add the signature.

In one example embodiment, the cNF uses the hash output of the http service request as a one-time variable.

In one example embodiment, the cNF builds the http service request with the access token that was delivered to the cNF from NRF.

In one example embodiment, a proxy node, e.g., SCP, forwards the http service request received from the cNF to the pNF, and the SCP includes the cNF certificate when forwarding the http service request to the pNF.

In one example embodiment, a statically configured and distributed symmetric secret key can be used in generating the hash of the http service request.

BRIEF DESCRIPTION OF THE FIGURES

FIG. 1 illustrates an example of a cNF-signed access token.

FIG. 2 illustrates an example embodiment in which the hash of the http request is used as the one-time variable/evidence associated with the access token.

DETAILED DESCRIPTION

Figure 3:
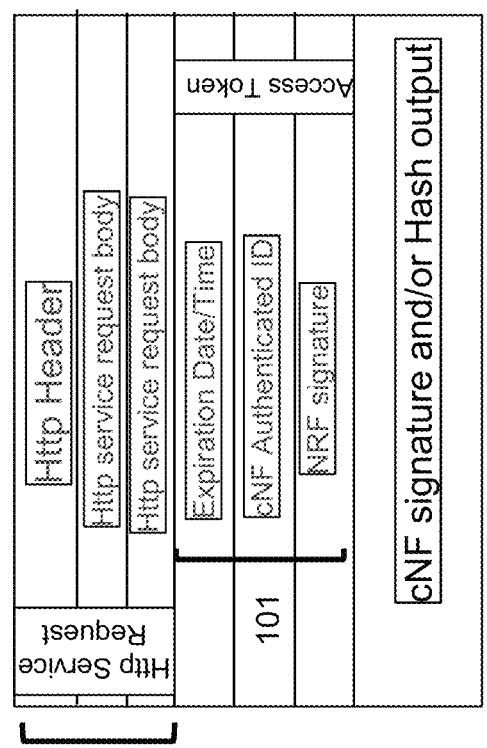
FIG. 3 illustrates an example embodiment in which the http service request and the access token are supplemented with a cNF signature and/or a hash as a protection mechanism.

In example embodiments of the present disclosure, mechanisms are provided to enable access token ownership validation during indirect communication or over secure hop-by-hop links with multiple proxy nodes in the middle between the cNF and the pNF, e.g., in the context of utilizing OAuth 2.0 protocol in 5GC. Although the present disclosure utilizes 5GC as example technology, the present disclosure is not limited to 5GC, and is applicable to various wireless technologies in which an authorization using an access token mechanism is used. For example, Oauth 2.0 is applicable for implementation in LTE, e.g., with the availability of Service Based Architecture (SBA).

In a first example embodiment of the present disclosure, secure hop-by-hop communication can be used to provide proof of ownership as long as there is a trust model among the pNF, the cNF and the proxy node between the pNF and the cNF, e.g., Service Communication Proxy (SCP). This static trust model can work in multiple ways. The following two ways are listed as examples: i) pNF and cNF are statically configured with the SCP(s) that is allowed to trust; or ii) pNF and cNF dynamically discover the trusted SCP(s), for example, using operator-secure-infrastructure Domain Name System (DNS) or the Network Repository Function (NRF). In this model, the SCP mutually authenticates the cNF using mutual Transport Layer Security (mTLS) protocol and the cNF certificate, as follows. SCP initially validates that the authorized ID in the access token is the ID of the cNF, e.g., validates that the NF Instance ID in the access token matches the NF Instance ID in the cNF certificate. The SCP then forwards the cNF service request and inserts the cNF authenticated ID or the cNF certificate for the pNF to use for validating the ownership of the access token. The form of the cNF authenticated ID in the access token can be one of the following or any other form that can be authenticated by the received: a) NF Instance ID, or b) hash of the cNF mTLS certificate.

Figure 1:
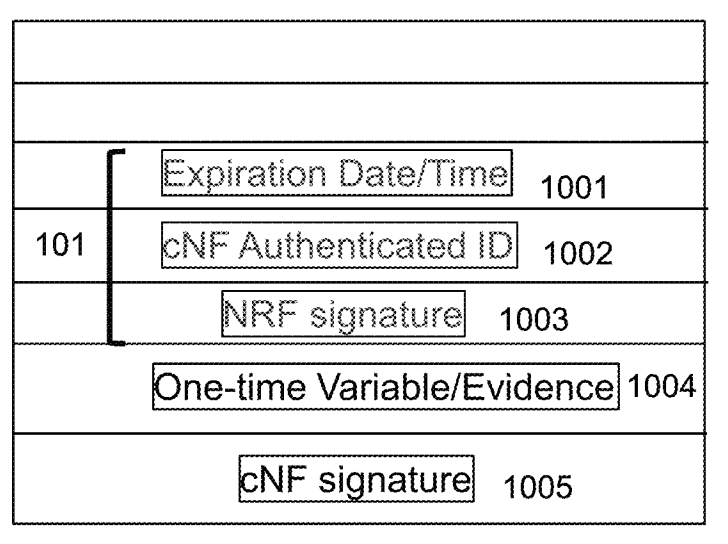

As shown in FIG. 1, which illustrate an example of a cNF-signed access token, the access token 101 includes expiration date/time 1001, cNF authenticated ID 1002, and NRF signature 1003. A one-time variable (or evidence) 1004 and cNF signature 1005 are attached to the access token 101. Some example embodiments for one-time variable/evidence 1004 can include: i) a timestamp at the time of cNF issuing the request; ii) an increasing random number or counter; and iii) the hash of the http request the cNF sent to the pNF through SCP. In the case the hash of the http request is used as the one-time variable/evidence 1004, the pNF should be able to identify the entire http request or the critical elements of the request which are protected by the hash that was sent by the cNF. The cNF signature 1005 is produced using cNF private key over the access token and the one-time variable/evidence (if the one-time variable/evidence is included).

In a second example embodiment of the present disclosure, when the cNF receives the access token from the NRF, the cNF performs the following prior to sending the service request to the pNF through SCP: i) adds the time stamp at the end of the access token; and ii) signs the whole access token including the time stamp by adding the cNF signature. The added timestamp ensures that the cNF-signed access token can be used for one time only, but this does not invalidate the access token until its expiration date. In other words, the cNF can keep using the access token until its expiration date, but every time the cNF issues a service request, the cNF inserts the time stamp at the time of issuing the service request and then signs the access token and the timestamp as explained above.

In a third example embodiment of the present disclosure, for each access token, the cNF will maintain a counter or an increasing random number, i.e., the cNF will save the last random number or counter value the cNF used when signing the access token, e.g., the cNF can save the random number or the counter value in the Unstructured Data Storage Function (UDSF). The cNF can use a single random number for all of its current access tokens, e.g., if the cNF has two access tokens for two different services, the cNF can maintain one single increasing random number for all the access tokens. The pNF saves and tracks the NF Instance ID or whatever ID is used to authenticate the NF and the cNF token random number.

In a fourth example embodiment of the present disclosure, the hash of the http request the cNF sent to the pNF through SCP is used as the one-time variable/evidence associated with the access token. As shown in FIG. 2, the access token 101 includes expiration date/time 1001, cNF authenticated ID 1002, and NRF signature 1003. Hash 2004 of the http service request (as a one-time variable or evidence shown in FIG. 1) and cNF signature 1005 are attached to the access token 101. For this example embodiment, the cNF performs the following: i) hashes the http request using, e.g., HMAC-256, ii) the hash 2004 is used as a one-time variable (1004 shown in FIG. 1); iii) signs the access token 201 using its private key; and iv) the signature 1005 covers the access token and the hash produced by hashing the http request.

FIG. 3 illustrates an example embodiment of the present disclosure, in which the http service request 301 and the access token are supplemented with a cNF signature and/or a hash as a protection mechanism. In this example embodiment, the cNF signature covers both the access token 101 and the http request 301 (which includes http header and http service request body) sent by the cNF to the pNF through the SCP. The cNF signature is produced using a cNF private key over the http request and the access token. In addition, or as an alternative, a hash of the combination of the http request 301, the access token 101 and a symmetric secret key (e.g., a statically configured symmetric key) is produced, which hash output can be added to the end of the combination of the http request 301 and the access token 101. The cNF signature and/or the hash can be added, e.g., each in its own http header. In the case the hash is being calculated over the http request 301 and a symmetric key between the cNF and the pNF, then the cNF signature is optional. In this example embodiment, based on the http header(s), the pNF is able to to identify the entire request or the critical parts of the request that was protected and sent by the cNF. Alternatively, the hash and the cNF signature can be part of another access token included in the Http request.

Figure 4:
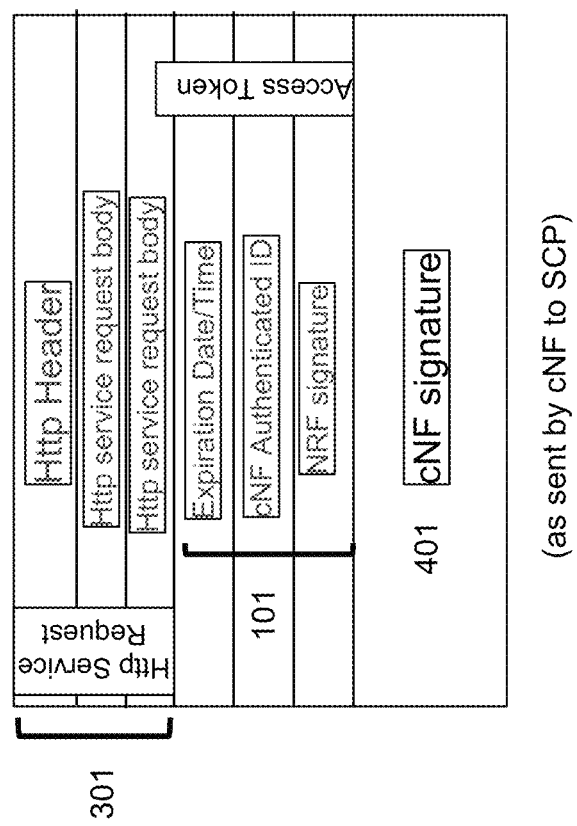
FIG. 4 illustrates an example embodiment in which the cNF signs the http service request and the access token with the cNF signature.
Figure 5:
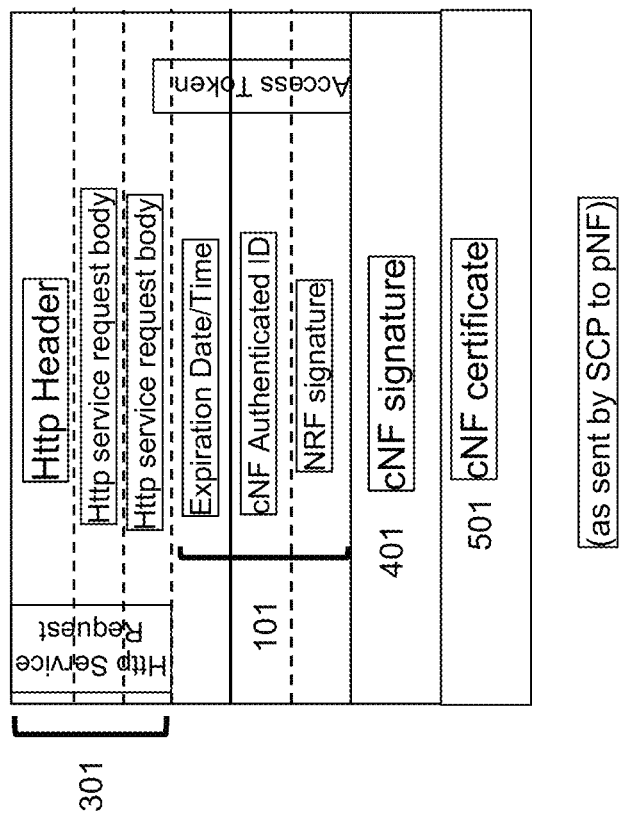
FIG. 5 illustrates an example embodiment in which the SCP adds the cNF certificate to the service request received from the cNF.

In a fifth example embodiment of the present disclosure, which example embodiment is explained in connection with FIGS. 4 and 5, the cNF performs the following: i) generates the http service request 301 (FIG. 4), and adds the access token 101 (FIG. 4) that was delivered to the cNF from the NRF; ii) signs the whole item (the http service request and the access token) using cNF certificate's private key and adds the cNF signature 401 as an http header; and iii) sends the whole item (the http service request 301, the access token 101 and the cNF signature 401) to the Service Communication Proxy (SCP). The SCP can validate the cNF access token ownership by validating that the cNF authenticated and authorized ID as included in the access token is the same as the cNF authenticated ID over mTLS. The SCP adds the cNF certificate 501 as an http header to the request received from the cNF, then the SCP forwards the entire request (which includes the http request 301, the cNF access token 101, the cNF signature 401, and the cNF certificate 501, as shown in FIG. 5) to the pNF. Alternatively, the cNF certificate can be sent by the cNF itself, e.g., as part of an access token or in a separate header. Any http header added by the SCP is on top of what has been received from cNF, i.e., any information added by the SCP shall not violate the cNF protection using the cNF signature, e.g., the SCP can't add any http headers between the cNF signature and the access token. When the pNF validates the cNF access token, the pNF performs the following: i) validates the access token NRF signature using the NRF public key; ii) validates the access token expiration date; iii) validates the cNF signature that protected the http service request including the cNF access token, using the cNF public key that is in the cNF certificate as inserted and forwarded by the SCP or as forwarded by the SCP what was inserted by the cNF.

In the example embodiments according to the present disclosure, an assurance mechanism provides an assurance to the pNF of the complete integrity of the proof of ownership evidence which the cNF included in connection with the http service request. Because the assurance mechanism ensures that the proof is end-to-end, i.e., the integrity of the proof extends all the way from the cNF to the pNF despite the fact that there is an SCP in the middle, the assurance mechanism is valid for any one or a combination of the previously proposed example embodiments. For example, all of the previously explained example embodiments use the certificate for ensuring the integrity of the proof of ownership coming from the cNF, as that solution is dynamic and scales well. However, a statically configured and distributed symmetric secret keys can be used instead of the asymmetric keys of the certificate. For example, a combination of an http request, an access token and a secret key can be hashed (e.g., using hash-based message authentication code (HMAC) such as HMAC-256), and the output of the hash can be included as part of the http service request to the pNF. The pNF hashes the received http service request the same way the cNF has done, using the same shared secret key to validate the http service request coming from the cNF. In this case, the shared secret key is mapped against the cNF authorized ID which is included in the access token.

In the following section, defenses provided by the above example embodiments against malicious attacks are discussed. In a first example, defense against an attack involving a cNF stealing a token is discussed. In this example attack, it is assumed that the attacking cNF is compromised, and the attacking cNF has access to the token of another cNF (referred to as the victim cNF), which victim cNF is used by the attacking cNF to receive service. The previously described example embodiments of authorizing/validating access token according to the present disclosure defeats this example attack because the attacking cNF, although having access to the victim cNF token, will not be able to sign the access token. If the attacker receives a victim cNF access token that has been already signed, the attacker will not be able to use the victim cNF signed access token because the time stamp is not valid.

In another example attack scenario, it is assumed that an attacker (e.g., attacking cNF) has compromised the SCP and can have access to the communication between the compromised SCP and a victim cNF, such that the attacker saves the victim cNF's signed token. If the attacker tries to use the victim cNF's signed token, the attack will fail because the signed token is valid for a single time and will fail the timestamp check.

Figure 6:
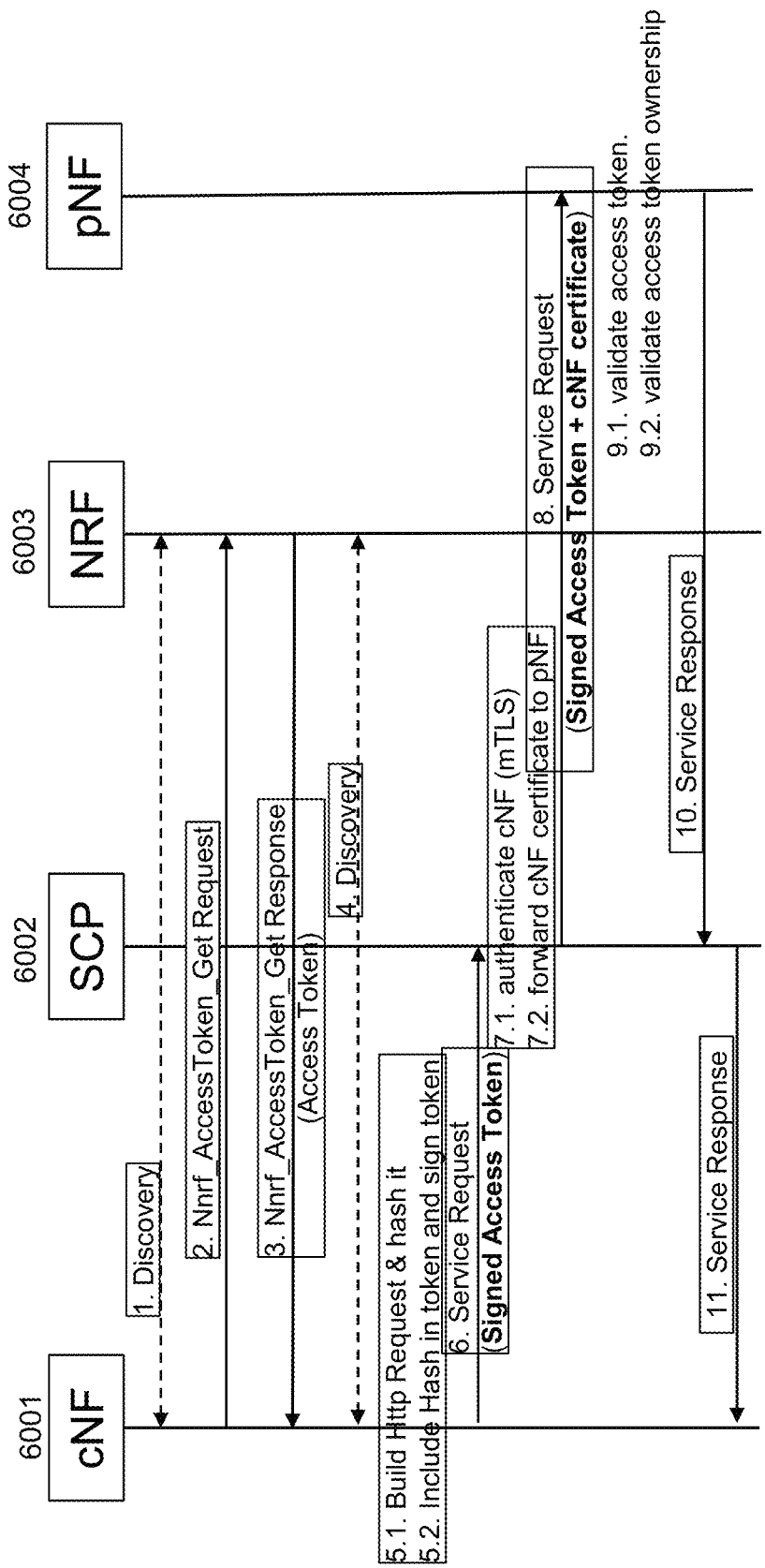
FIG. 6 illustrates an example call flow sequence for various example embodiments according to the present disclosure.
Figure 7:
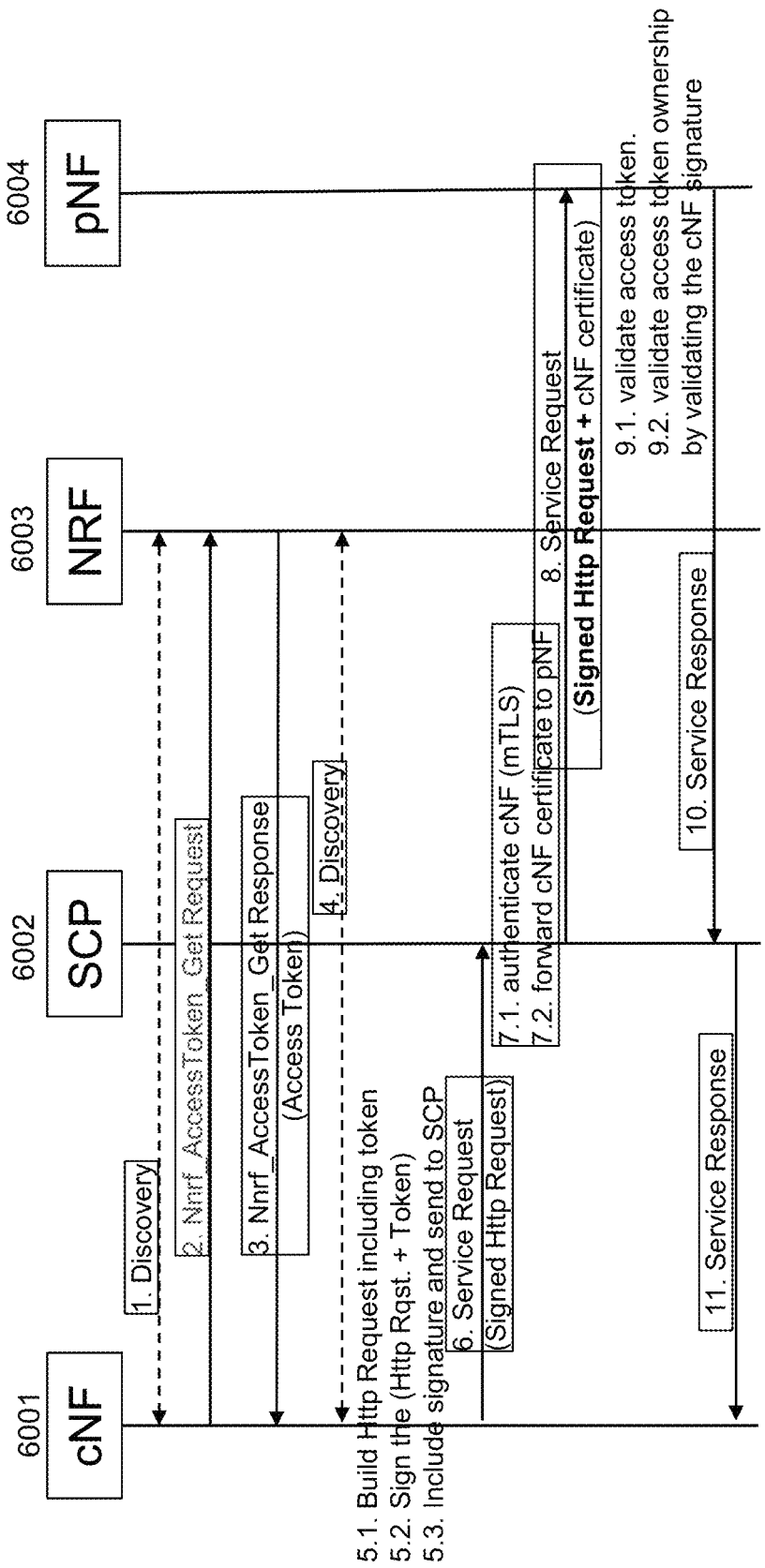
FIG. 7 illustrates an example call flow sequence for another example embodiment according to the present disclosure.
Figure 8:
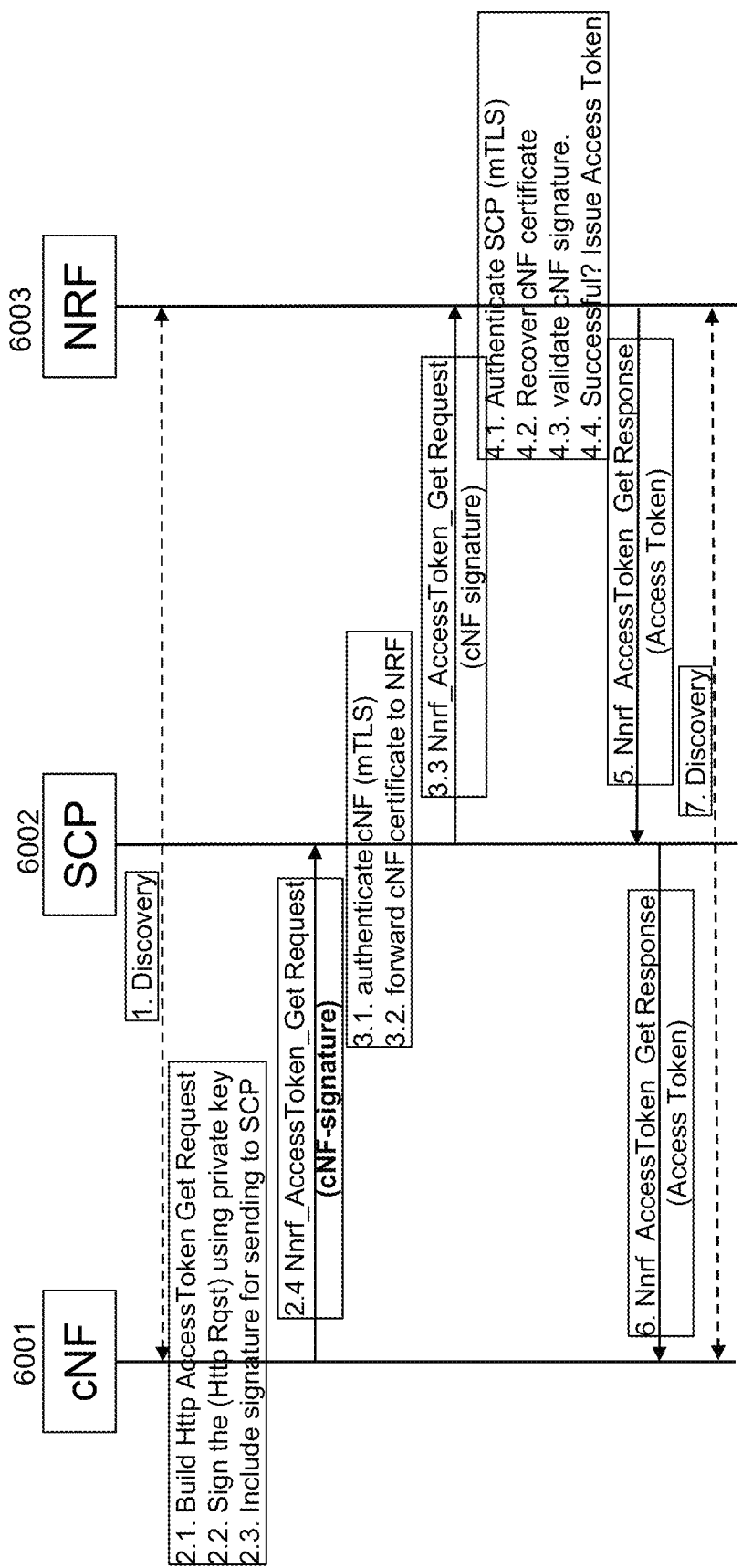
FIG. 8 illustrates an example call flow for the NRF authentication of cNF.
Figure 9:
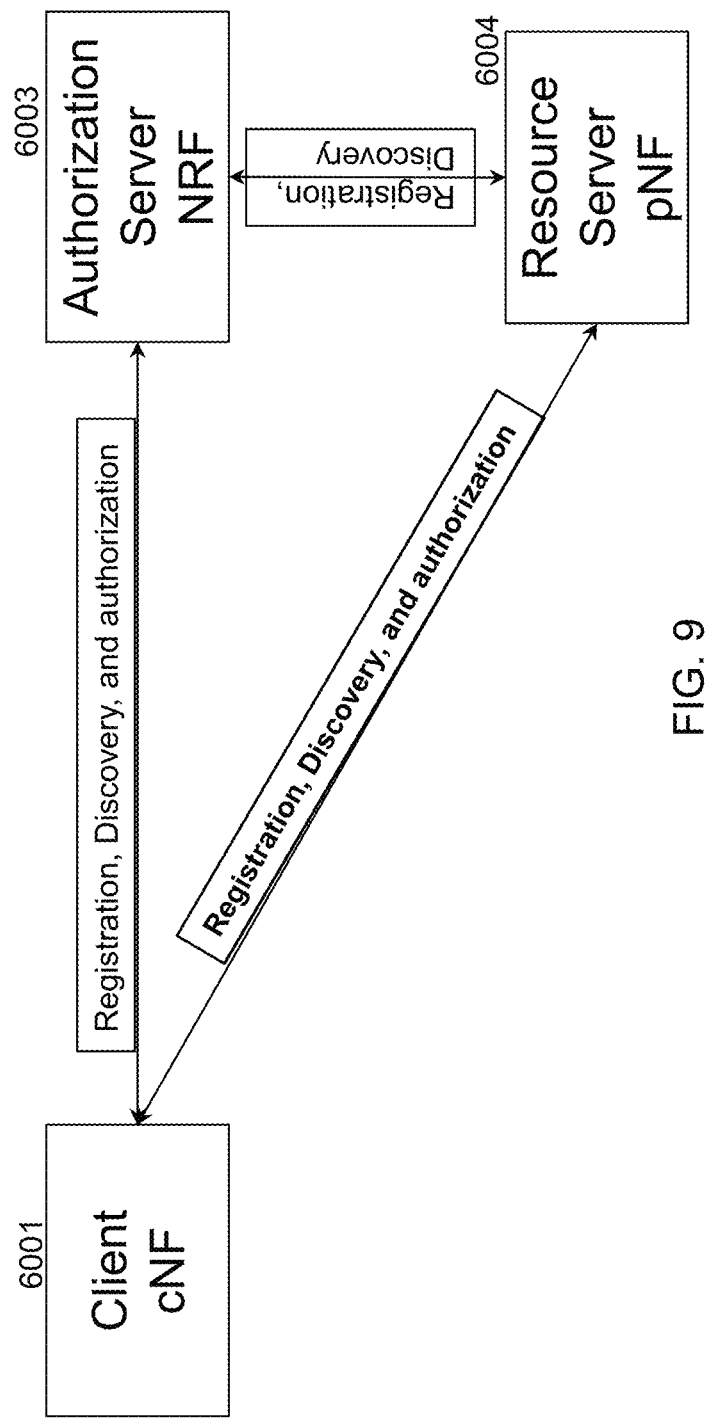
FIG. 9 illustrates the infrastructure nodes used for 5GC direct communication.
Figure 10:
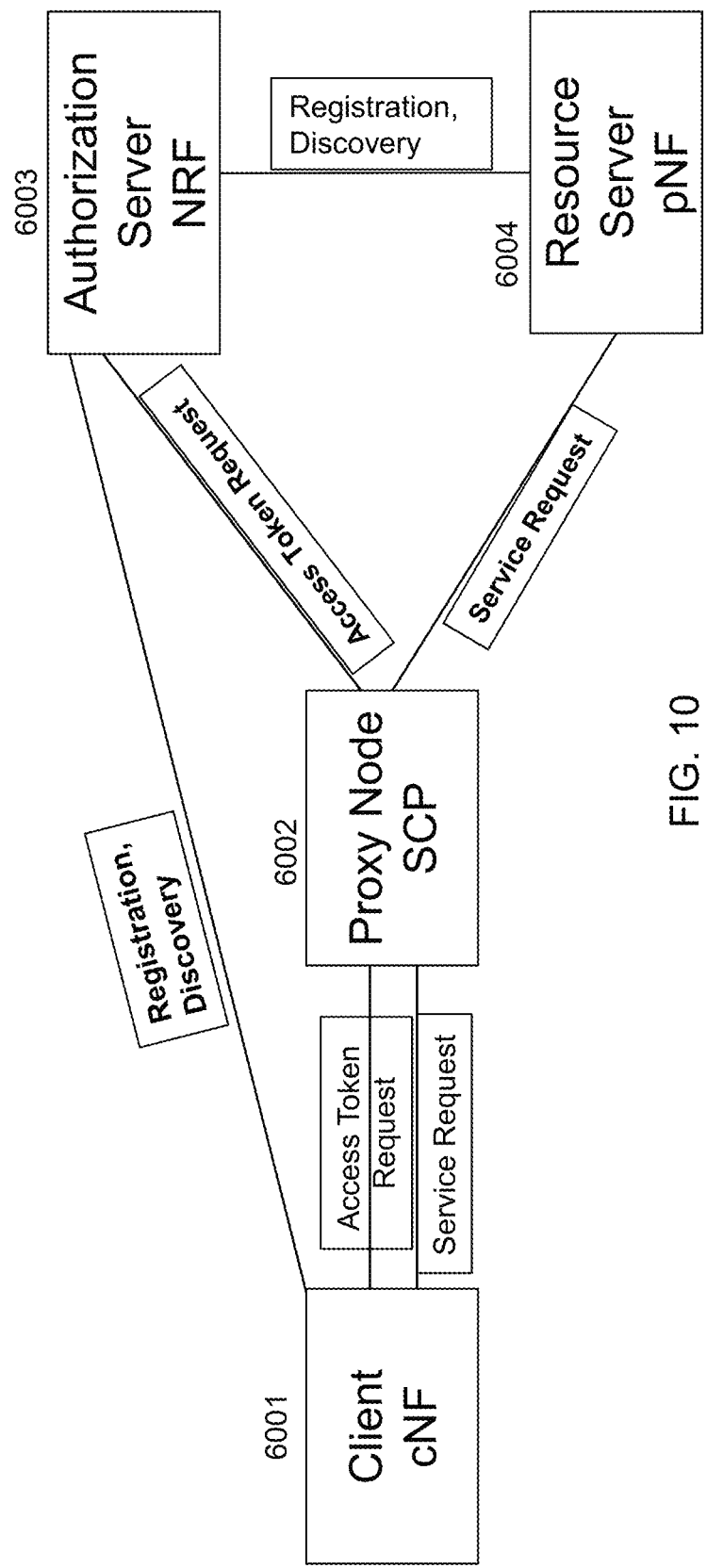
FIG. 10 illustrates the infrastructure nodes used for 5GC indirect communication using a proxy node.

Before describing the example call flow sequences in FIGS. 6, 7 and 8 for the various example embodiments, brief explanations of different communication infrastructures are provided, i.e., FIG. 9 illustrates the infrastructure nodes used for 5GC direct communication (without using a proxy node, e.g., SCP), and FIG. 10 illustrates the infrastructure nodes used for 5GC indirect communication using a proxy node, e.g., SCP. As shown in FIG. 9, for 5GC direct communication, the client, cNF 6001, can communicate with i) authorization server, NRF 6003, and ii) resource server, pNF 6004, for registration, discovery and authorization. For registration and/or discovery, cNF 6001 or pNF 6004 can initiate the communication to NRF 6003 (and FIG. 9 shows communication between pNF 6004 and NRF 6003 for registration and/or discovery). For access token (i.e., authorization) request, cNF 6001 initiates communication to NRF 6003. For service request, cNF 6001 initiates communication to pNF 6004.

As shown in FIG. 10, for 5GC indirect communication, for registration and/or discovery, cNF 6001 or pNF 6004 can initiate the communication to NRF 6003. For registration and/or discovery, cNF 6001 or pNF 6004 can initiate the communication to NRF 6003, via proxy node, SCP 6002. For service request, cNF 6001 initiates communication to pNF 6004, via proxy node, SCP 6002.

FIG. 6 illustrates an example call flow sequence, e.g., for the above-described first, second, third and fourth example embodiments. In step 1, discovery is initiated by cNF 6001 which communicates with NRF 6003. In step 2, cNF 6001 sends Nnrf_AccessToken_Get Request to NRF 6003. In step 3, Nnrf_AccessToken_Get Response (i.e., access token) is sent by NRF 6003 to cNF 6001. In step 4, further discovery communication occurs between cNF 6001 and NRF 6003. In step 5.1, cNF 6001 builds an http request and hashes it. In step 5.2, cNF 6001 includes the hash (output) in the access token and signs the entire access token. In step 6, cNF 6001 sends the signed access token as part of the service request to the SCP 6002. In step 7.1, SCP 6002 authenticates the cNF using mutual Transport Layer Security (mTLS) protocol and the cNF certificate, e.g., as described above in connection with the first example embodiment. In step 7.2, SCP 6002 prepares to forward the cNF certificate to pNF 6004. In step 8, service request (including the signed access token and the cNF certificate) is forwarded to the pNF 6004. In step 9.1, pNF 6004 validates the access token, and in step 9.2, pNF 6004 validates the ownership of the access token. In step 10, pNF 6004 sends the service response to SCP 6002, which in turn forwards the service response to cNF 6001 in step 11.

FIG. 7 illustrates an example call flow sequence, e.g., for the above-described fifth example embodiment. In step 1, discovery is initiated by cNF 6001 which communicates with NRF 6003. In step 2, cNF 6001 sends Nnrf_AccessToken_Get Request to NRF 6003. In step 3, Nnrf_AccessToken_Get Response (i.e., access token) is sent by NRF 6003 to cNF 6001. In step 4, further discovery communication occurs between cNF 6001 and NRF 6003. In step 5.1, cNF 6001 builds an http request including an access token. In step 5.2, cNF 6001 signs the http request including the access token. In step 5.3, cNF 6001 includes the signature in the http request including the access token for forwarding to SCP. In step 6, cNF 6001 sends the service request, including the signed http request and the signed access token to the SCP 6002. In step 7.1, SCP 6002 authenticates the cNF using mutual Transport Layer Security (mTLS) protocol, e.g., the SCP can validate the cNF access token ownership by validating that the cNF authenticated and authorized ID as included in the access token is the same as the cNF authenticated ID over mTLS. In step 7.2, SCP 6002 prepares to forward the cNF certificate to pNF 6004, e.g., by adding the cNF certificate to the signed http request including the access token. In step 8, service request (including the signed http request including the access token and the cNF certificate) is forwarded to the pNF 6004. In step 9.1, pNF 6004 validates the access token, and in step 9.2, pNF 6004 validates the ownership of the access token, e.g., by validating the cNF signature. In step 10, pNF 6004 sends the service response to SCP 6002, which in turn forwards the service response to cNF 6001 in step 11.

The above-described example embodiments in the present disclosure are also applicable to establish mutual authentication between the cNF and the NRF. The previously described fifth example embodiment is used here as an example of the applicability. For the case in which the cNF sends an access token request to the NRF via SCP, the cNF performs the following: i) generates the http access token request; ii) signs the http access token request using the cNF private key and includes the signature as an http header; and iii) sends the http access token request and the cNF signature to the SCP over a secure mTLS connection. SCP then forwards the http access token request from the cNF to the NRF, and SCP includes the cNF certificate as another http header. NRF validates the authenticity of the http access token request by validating the cNF signature using the cNF public key as in the forwarded cNF certificate. If the NRF validation is successful, NRF processes the access token request and issues an access token to the cNF.

FIG. 8 illustrates the example call flow for the NRF authentication of cNF. In step 1, discovery is initiated by cNF 6001 which communicates with NRF 6003. In step 2.1, cNF 6001 generates the http_Access_Token_Get request. In step 2.2., cNF 6001 signs the http_Access_Token_Get request using the cNF private key, and cNF 6001 includes (in step 2.3) the cNF signature as an http header for sending to SCP 6002. In step 2.4, cNF 6001 sends the Nnrf_Access Token_Get Request including the cNF signature to the SCP 6002 over a secure mTLS connection. In step 3.1, SCP 6002 authenticates the cNF using mutual Transport Layer Security (mTLS) protocol. In step 3.2, SCP 6002 forwards the cNF certificate to NRF 6003. In step 3.3., SCP 6002 forwards the Nnrf_Access Token_Get Request including the cNF signature to the NRF 6003. In step 4.1, NRF 6003 authenticates SCP 6002 using mTLS, followed by recovering the cNF certificate (step 4.2), and validating the cNF signature (step 4.3). In step 4.4, if the validation of the cNF signature is successful, NRF 6003 issues an access token. In step 5, NRF 6003 sends Nnrf_Access Token_Get Response including the access token to SCP 6002, which in turn forwards the Nnrf_Access Token_Get Response including the access token to the cNF 6001 in step 6. Additional discovery between cNF 6001 and NRF 6003 is shown in step 7.

In this section, cNF authentication of NRF during indirect communication is briefly described. If it is required for the cNF to authenticate the NRF, the NRF signs the http Access_Token_Get Response and includes it as an http header protecting the whole http request and the access token. When the SCP receives the Access_Token_Get Response, the SCP includes the NRF certificate and then forwards to the cNF. The cNF validates the NRF signature of the http Access_Token_Get Response using the NRF public key. One example validation mechanism can be implemented by configuring the cNF with the NRF public key or certificate, thereby eliminating the need for the SCP to include the NRF certificate.

Some of the advantages of the above-described example embodiments in connection with authorization are described below:

An example embodiment provides an end-to-end mechanism which allows the resource server, e.g., producer Network Function (pNF), to validate whether the client, e.g., consumer Network Function (cNF), is the owner of the access token that has been issued and authorized by the Authorization Server, e.g., NRF, and is being presented in the received Http service request.

An example embodiment provides a validation mechanism which is executed by the pNF and is based on the client (cNF) signature of the access token that has been signed by the NRF and issued to the client (cNF).

An example embodiment provides a validation mechanism which is strictly tied to the current Http Service Request which is presented by a proxy node, e.g., SCP, on behalf of the cNF to the pNF.

An example embodiment provides a time stamp which is i) used as a mechanism to tie the access token signed by the cNF to the current Http Service Request, and ii) protected by the cNF signature of the access token.

An example embodiment provides the use of an increasing random number to tie the access token signed by the cNF to the current Http Service Request, which random number is protected by the cNF signature of the access token.

An example embodiment provides the use of a Hash of the Http Service Request (HASH) to tie the access token signed by the cNF to the current Http Service Request, which HASH is protected by the cNF signature of the access token.

An example embodiment provides the use of a validation mechanism which is executed by the pNF and which is based on the client (cNF) signature of the whole Http Service Request that includes the access token issued and signed by the NRF to the cNF, thereby directly tying the access token to the current Http service request being presented to the pNF by a proxy node, e.g., SCP.

An example embodiment provides the use of a validation mechanism which is executed by the pNF and which is based on a Hash of the combination of the Http Service Request, the access token and a shared secret key between the cNF and the pNF, wherein the output of the Hash is added to the end of the Http Service Request, and wherein the pNF validates the Hash by i) hashing the Http service request including the access token and the shared secret key, and ii) comparing the Hash function output to the HASH included with the Http service request as received from the cNF through the SCP.

An example embodiment provides the use of a validation mechanism in which the pNF validates the cNF signature using the cNF public key that is included in the cNF certificate which is signed by a trusted Certificate Authority (CA).

An example embodiment provides the use of a validation mechanism in which the pNF receives the cNF certificate in the Http service request where the cNF certificate has been added by the SCP.

An example embodiment provides the use of a validation mechanism in which the pNF receives the cNF certificate in the Http service request where the cNF certificate has been added to the Http service request by the cNF itself.

Some of the advantages of the above-described example embodiments in connection with authentication of the client are described below:

An example embodiment provides an end-to-end mechanism which allows the Authorization Server, e.g., an NRF, to authenticate the client, e.g., cNF, which is requesting authorization through a proxy node, e.g., SCP, wherein the NRF is required to authenticate the client before authorizing the client and issuing it an access token.

An example embodiment provides an authentication mechanism which is executed by the NRF and which is based on the client (cNF) signature of the Http Access_Token Get Request.

An example embodiment provides an authentication mechanism which is executed by the NRF and which is based on the client (cNF) signature of the Http Access_Token Get Request that includes a timestamp of the time the cNF issued the Http Service Request.

An example embodiment provides an authentication mechanism which is executed by the NRF and which is based on the client (cNF) signature of the Http Access_Token Get Request that includes an increasing random number that was inserted by the cNF, wherein the cNF tracks the increasing random number, and the NRF tracks each cNF increasing random number.

An example embodiment provides an authentication mechanism in which the NRF receives the cNF certificate in the Http Access_Token_Get request, wherein the cNF certificate has been added by the SCP.

An example embodiment provides an authentication mechanism in which the NRF receives the cNF certificate in the Http Access_Token_Get request, wherein the cNF certificate has been added to the Http service request by the cNF itself.

An example embodiment provides an authentication mechanism which is executed by the NRF and which is based on a Hash of the combination of the Http Access_Token_Get Request and a shared secret key between the cNF and the NRF, wherein the output of the Hash is added to the end of the Http Access_Token_GET Request, and wherein the NRF authenticates the Hash by i) hashing the Http Access_Token_Get request and the shared secret key, and ii) comparing the Hash function output to the HASH included with the Http Access_Token_GET request as received from the cNF through the SCP.

An example embodiment provides an authentication mechanism in which the cNF is authenticated during the access token allocation, whereby signing of the access token is not implemented.

An example embodiment provides an authentication mechanism which is executed during the DISCOVERY or the REGISTRATION of the cNF with the NRF in case the REGISTRATION or the DISCOVERY happens through the proxy node, e.g., SCP.

As a summary, several examples of the method according to the present disclosure are provided.

A first example of the method according to the present disclosure provides a method of performing validation of an access token for wireless communication, comprising: providing, by an authorization server, the access token for service to a client in response to a request for the access token; adding, by the client, a client signature to at least the access token; forwarding, by the client, the access token as part of a service request to a resource server; and validating, by the resource server, whether the client is a valid owner of the access token, wherein the validation is based on at least the client signature of the access token.

In a second example of the method modifying the first example of the method, the validation of the access token is under OAuth 2.0 protocol, the resource server is a producer Network Function (pNF), the client is a consumer Network Function (cNF), and the authorization server is a network repository function (NRF), and wherein the access token additionally includes a signature of the authorization server.

In a third example of the method modifying the second example of the method, the service request is forwarded from the client via a proxy node to the resource server.

In a fourth example of the method modifying the first example of the method, a time stamp is associated with the access token signed by the client and forwarded as part of the service request, and wherein the time stamp is protected by the signature of the client on the access token.

In a fifth example of the method modifying the first example of the method, an increasing random number is associated with the access token signed by the client and forwarded as part of the service request, and wherein the increasing random number is protected by the signature of the client on the access token.

In a sixth example of the method modifying the first example of the method, a hash of the service request is associated with the access token signed by the client and forwarded as part of the service request, and wherein the hash of the service request is protected by the signature of the client on the access token.

In a seventh example of the method modifying the third example of the method, the client signature is provided for the entire service request including the access token, and wherein the access token is signed by the authorization server, whereby the access token is associated with the service request forwarded to the resource server by the proxy node.

In an eight example of the method modifying the third example of the method, the validation is based on a hash of a combination of the service request, the access token and a shared secret key common to the client and the resource server, and wherein the output of the hash is added to the service request, and wherein the resource server validates the hash by i) hashing the service request including the access token and the shared secret key, and ii) comparing the output of the hashing by the resource server with the hash added to the service request received via the proxy node.

In a ninth example of the method modifying the third example of the method, the resource server validates the client signature using a client server public key included in a client server certificate signed by a trusted certificate authority (CA).

In a tenth example of the method modifying the ninth example of the method, the client server certificate is added to the service request by the proxy node, and wherein the resource server receives the client server certificate in the service request.

In an eleventh example of the method modifying the ninth example of the method, the client server certificate is added to the service request by the client server, and wherein the resource server receives the client server certificate in the service request.

A twelfth example of the method according to the present disclosure provides a method of performing authentication of a client for wireless communication, comprising: sending, by the client, a request to an authorization server via a proxy node, to obtain an access token, wherein the request to obtain the access token contains a client signature of the client; authenticating, by the authorization server, the client as a valid recipient of the access token; and authorizing, by the authorization server, the access token to the client after authenticating the client, wherein the authorization is based on at least the client signature contained in the request to obtain the access token.

In a thirteenth example of the method modifying the twelfth example of the method, the authentication of the access token is under OAuth 2.0 protocol, the client is a consumer Network Function (cNF), the authorization server is a network repository function (NRF), and the proxy node is a Service Communication Proxy (SCP).

In a fourteenth example of the method modifying the twelfth example of the method, the request to obtain the access token additionally contains a timestamp of when the client issued the request to obtain the access token.

In a fifteenth example of the method modifying the twelfth example of the method, the request to obtain the access token additionally contains an increasing random number inserted by the client and tracked by both the client and the authorization server.

In a sixteenth example of the method modifying the twelfth example of the method, the request to obtain the access token additionally contains a client certificate added by the proxy node.

In a seventeenth example of the method modifying the twelfth example of the method, the request to obtain the access token additionally contains a client certificate added by the client.

In an eighteenth example of the method modifying the twelfth example of the method, the authentication is based on a hash of a combination of the request to obtain the access token and a shared secret key common to the client and the authorization server, and wherein the output of the hash is added to the request to obtain the access token, and wherein the authorization server authenticates the hash by i) hashing the request to obtain the access token and the shared secret key, and ii) comparing the output of the hashing by the authorization server with hash added to the request to obtain the access token received from the client via the proxy node.

In a nineteenth example of the method modifying the twelfth example of the method, the client is authenticated during access token allocation, whereby signing of the access token is not implemented.

In a twentieth example of the method modifying the twelfth example of the method, the authentication is performed during one of discovery or registration of the client with the authorization server in the case the one of the discovery or registration is implemented through the proxy node.

GLOSSARY OF TERMS

3GPP: 3rd Generation Partnership Project
5GC: 5th Generation Core (Network)
5GS: 5th Generation System
CA: Certificate Authority
cNF: consumer Network Function (the role of client for Oauth 2.0).
hash (function): one-way mathematical algorithm mapping data of arbitrary size to a bit array of a fixed size (the hash value or hash output).
Http: Hypertext Transfer Protocol
mTLS: mutual Transport Layer Security protocol.
NRF: Network Repository Function (the role of authorization server for Oauth 2.0).
OAuth 2.0: authorization protocol for 5GC
pNF: producer Network function (the role of resource server for Oauth 2.0).
SCP: Service Communication Proxy
UDSF: Unstructured Data Storage Function

What is claimed is:

1. A method of performing validation of an access token for wireless communication, comprising:
providing, by an authorization server, the access token for service to a client in response to a request for the access token;
adding, by the client, a client signature to at least the access token;
forwarding, by the client, the access token as part of a service request to a resource server; and
validating, by the resource server, whether the client is a valid owner of the access token, wherein the validation is based on at least the client signature of the access token;
wherein an increasing random number is associated with the access token signed by the client and forwarded as part of the service request, and wherein the increasing random number is protected by the signature of the client on the access token, and wherein the client signature is provided for the entire service request including the access token, and wherein the access token is signed by the authorization server, whereby the access token is associated with the service request forwarded to the resource server by the proxy node.

2. The method of claim 1, wherein the resource server validates the client signature using a client server public key included in a client server certificate signed by a trusted certificate authority (CA).

3. The method of claim 2, wherein the client server certificate is added to the service request by the proxy node, and wherein the resource server receives the client server certificate in the service request.

4. The method of claim 2, wherein the client server certificate is added to the service request by the client server, and wherein the resource server receives the client server certificate in the service request.

5. A method of performing validation of an access token for wireless communication, comprising:
providing, by an authorization server, the access token for service to a client in response to a request for the access token;
adding, by the client, a client signature to at least the access token;
forwarding, by the client, the access token as part of a service request to a resource server; and
validating, by the resource server, whether the client is a valid owner of the access token, wherein the validation is based on at least the client signature of the access token;
wherein a hash of the service request is associated with the access token signed by the client and forwarded as part of the service request, and wherein the hash of the service request is protected by the signature of the client on the access token, and wherein the client signature is provided for the entire service request including the access token, and wherein the access token is signed by the authorization server, whereby the access token is associated with the service request forwarded to the resource server by the proxy node.

6. The method of claim 5, wherein the resource server validates the client signature using a client server public key included in a client server certificate signed by a trusted certificate authority (CA).

7. The method of claim 6, wherein the client server certificate is added to the service request by the proxy node, and wherein the resource server receives the client server certificate in the service request.

8. The method of claim 6, wherein the client server certificate is added to the service request by the client server, and wherein the resource server receives the client server certificate in the service request.

9. A method of performing validation of an access token for wireless communication, comprising:
providing, by an authorization server, the access token for service to a client in response to a request for the access token;
adding, by the client, a client signature to at least the access token;
forwarding, by the client, the access token as part of a service request to a resource server; and
validating, by the resource server, whether the client is a valid owner of the access token, wherein the validation is based on at least the client signature of the access token;
wherein an increasing random number is associated with the access token signed by the client and forwarded as part of the service request, and wherein the increasing random number is protected by the signature of the client on the access token, and wherein the validation is based on a hash of a combination of the service request, the access token and a shared secret key common to the client and the resource server, and wherein the output of the hash is added to the service request, and wherein the resource server validates the hash by i) hashing the service request including the access token and the shared secret key, and ii) comparing the output of the hashing by the resource server with the hash added to the service request received via the proxy node.

10. A method of performing validation of an access token for wireless communication, comprising:
providing, by an authorization server, the access token for service to a client in response to a request for the access token;
adding, by the client, a client signature to at least the access token;
forwarding, by the client, the access token as part of a service request to a resource server; and
validating, by the resource server, whether the client is a valid owner of the access token, wherein the validation is based on at least the client signature of the access token;
wherein a hash of the service request is associated with the access token signed by the client and forwarded as part of the service request, and wherein the hash of the service request is protected by the signature of the client on the access token, and wherein the validation is based on a hash of a combination of the service request, the access token and a shared secret key common to the client and the resource server, and wherein the output of the hash is added to the service request, and wherein the resource server validates the hash by i) hashing the service request including the access token and the shared secret key, and ii) comparing the output of the hashing by the resource server with the hash added to the service request received via the proxy node.

* * * * *